(12) United States Patent
Soquet (10) Patent No.: US 11,397,542 B1
(45) Date of Patent: *Jul. 26, 2022

(54) REDUCING RAM USAGE IN A RUNTIME ENVIRONMENT

(71) Applicant: Moddable Tech, Inc., Menlo Park, CA (US)

(72) Inventor: Patrick Soquet, Chastre (BE)

(73) Assignee: Moddable Tech, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,311

(22) Filed: Oct. 8, 2020

Related U.S. Application Data (63) Continuation of application No. 15/986,623, filed on May 22, 2018, now Pat. No. 10,838,657.

(60) Provisional application No. 62/510,188, filed on May 23, 2017.

(51) Int. Cl.
*G06F 9/44* (2018.01)
*G06F 9/445* (2018.01)
*G06F 3/00* (2006.01)
*G06F 11/36* (2006.01)
*G06F 3/06* (2006.01)

(52) U.S. Cl.
CPC ............ *G06F 3/0659* (2013.01); *G06F 3/061* (2013.01); *G06F 3/068* (2013.01)

(58) Field of Classification Search
CPC ........ G06F 3/0659; G06F 3/061; G06F 3/068; G06F 9/384; G06F 9/3836; G06F 9/3001; G06F 9/30145; G06F 9/30167; G06F 9/3455; G06F 9/3897
See application file for complete search history.

(56) References Cited

U.S. PATENT DOCUMENTS

| | | | |
|---|---|---|---|
| 10,877,743 B2 * | 12/2020 | Yamada | G06F 11/00 |
| 2015/0242314 A1 * | 8/2015 | Hsu | G01C 19/00 |
| | | | 702/141 |

OTHER PUBLICATIONS

Pamboris et al., C-RAM: Breaking Mobile Device Memory Barriers Using the Cloud, 14 pages (Year: 2016).*

* cited by examiner

*Primary Examiner* — Thuy Dao
(74) *Attorney, Agent, or Firm* — Hickman Becker Bingham Ledesma LLP (57) ABSTRACT

A computing device and method for reducing memory usage in a runtime. The method is performed in a computer system having a non-volatile memory (ROM) containing initial states of objects for the runtime and volatile memory (RAM). An alias table in RAM is accessed corresponding with an object in ROM. If the there is an alias referenced in RAM, then computation is performed upon the alias rather than the object in ROM. Otherwise, if there is no alias then computation is performed upon the one in ROM. If the object is required to be updated, then it is stored as an alias referenced by the alias table stored in RAM.

17 Claims, 5 Drawing Sheets

Figure 2: Software architecture

REDUCING RAM USAGE IN A RUNTIME ENVIRONMENT

CROSS REFERENCE TO RELATED APPLICATIONS

This application claims the benefit of U.S. Provisional Patent Application No. 62/510,188 entitled "Reducing RAM Usage in a Dynamic Virtual Machine" filed May 23, 2017.

FIELD OF THE INVENTION

The present invention is related to the field of memory management in runtimes with limited resources, especially those implemented with dynamic virtual machines.

BACKGROUND

The use of dynamic scripting languages is desirable as it has been shown to enable delivery of more robust, secure products which can be updated more easily, all for a lower overall development cost. In addition, scripting languages are now preferred for implementing user interfaces, which will take on increasing importance as the use of displays in IoT devices increases.

Scripting languages have been used in limited resource computing devices (e.g microcontroller unit s aka MCUs) such as those used in so-called "Internet of Things" (hereinafter "IoT"), for example, those with CPUs running between 40 and 200 MHz, and having between 32 and 512 KB of volatile memory (aka "RAM") in the prior art. These implementations, however, have significant constraints including reduced language function, incompatibilities with language specification/standards, limited runtime object library support, and extremely limited space for script code and data. Most constraints are a consequence of the limited RAM available in these devices.

There therefore exists a need for better memory usage in a runtime environment where such resources are limited.

SUMMARY

Disclosed is a computing device and method for reducing memory usage in a runtime. The device comprises a processor, a volatile memory (RAM) coupled to the processor, and a non-volatile memory (ROM) coupled to the processor comprising a runtime image executable by the processor comprising. The runtime image comprises code executable by the processor, the code comprising a memory image resulting from an initialization phase of the code. The initialization phase of the code generates immutable information about code objects, the information being immutable in memory when the code is being executed. The device further comprises code executable by the processor for storing mutable information about the code objects into the RAM into an alias table. Entries in the RAM are associated with corresponding entries for the code objects stored in the ROM, and references an alias in memory for mutable information about the object when the object is modified.

The method is performed in a computer system having a non-volatile memory (ROM) containing initial states of objects for the code and volatile memory (RAM). The method comprises accessing a first object in the RAM, the first object having a first location in the RAM (e.g. in an alias table) corresponding to a second object having a second location in the ROM (the initial state of the object). The method then determines whether there is a third object in the RAM (e.g. an alias) referenced by the second object (e.g. it is not NULL). If the third object is referenced in the RAM (there is an alias), then computation is performed upon the third object, the alias. Else, if the third object is not referenced in RAM (e.g. not NULL), then computation is performed upon the second object (e.g. the one stored in ROM), and if necessary to be stored, it is stored at a new location in RAM as an alias referenced by the alias table stored in RAM.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

Figure 1:
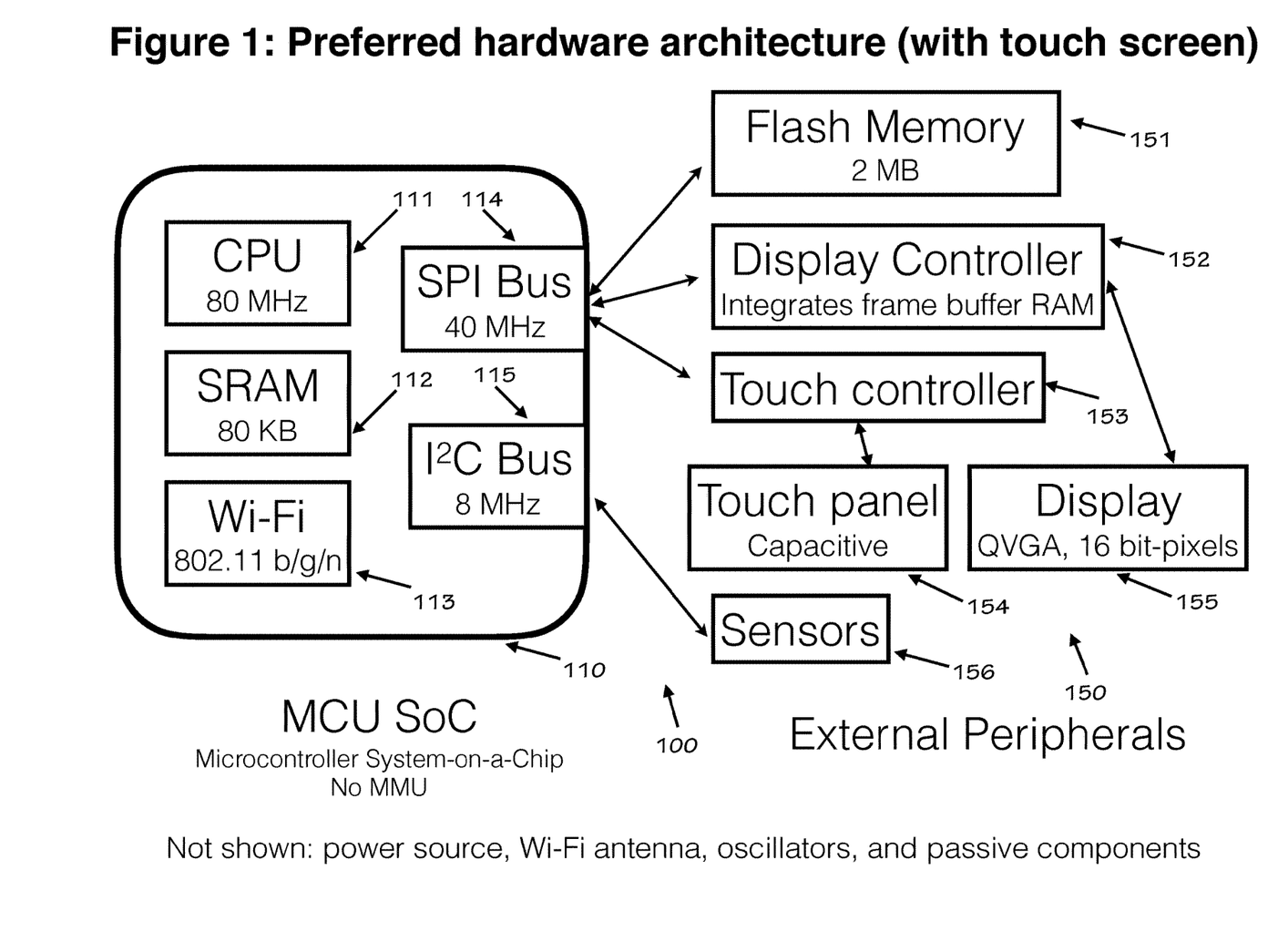
FIG. 1 shows a functional system block diagram of hardware components in embodiments of the present invention.

A functional block diagram of hardware components of a device 100 such as an IoT device in which embodiments of the present invention may be implemented is shown in FIG. 1. Each functional block of device 100 is described and may include a combination of software, electronic, electrical and mechanical components. The specific design of the interaction of these components is design-dependent according to the designer's wishes and can be understood by those well-versed in the computer and electromechanical arts. Some unnecessary components are omitted in particular designs, FIG. 1 only describes one such implementation.

Device 100 comprises a microcontroller 110 which, in embodiments of the present invention, is a self-contained system-on-a-chip (SOC) (which contains an almost complete computer—CPU, volatile memory, non-volatile memory) programmed to perform the functions described in this disclosure herein. Such a microcontroller 110 may be a programmed general purpose computer with software loaded upon it for the functionality described herein, such as those widely available, which contain all the typical computer components—processors 111, memory 112 (volatile and non-volatile memory according to design such as SRAM), buses 114, 115 for interfacing with external components etc. . . . . In other embodiments, it may be dedicated logic. In some embodiments, microcontroller 110 includes a network interface, such as Ethernet or Wi-Fi such as various implementations of the 802.11 standard, such as b/g/and or n, according to design.

In embodiments of the present invention microcontroller MCU 110 is an ARM type computer, such as a ARM Cortex-M3 CPU or Xtensa Instruction Set Architecture (ISA) Version 8 as used by the ESP8266 from Espressif, running a lightweight Real-Time Operation System (RTOS) such as FreeRTOS or Zephyr with all the associated functionality and custom software loaded thereupon during runtime. Of course, as is known to those skilled in the art, such a microcontroller may be implemented in any number of ways, such as by an SOC, gate arrays, state machines implemented in hardware or other apparatus capable of performing the functions recited herein. Functionality of the device can be provided by software executed by the microcontroller at the appropriate time (e.g. runtime or startup time), and from various sources known to those skilled in the art (e.g. local or remote non-volatile memory such as firmware or over a communications medium from a known or discovered source, such as Network Attached Storage, a server or over the internet).

Microcontroller 110 communicates with the various other functional components of device 100 through one or more buses 114, 115. This allows control and monitoring of the various components 150 of device 100, such as non-volatile (e.g. Flash aka EEPROM, or other non-volatile storage means) memory 151, (referred to generally as "ROM" for the remainder of this disclosure) etc. . . . . While such bus(es) 114 include relevant circuitry for communication and control of such devices 150, it is understood by those skilled in the art that certain devices may already communicate in the digital domain, while others are in the analog domain. The relevant circuitry for communication and control (e.g. digital to analog converters [DAC's]) may be distributed amongst each of the device(s) 150 and the buses 114, 115 or intermediate circuitry depending upon implementation. Of course, the functional components 150 may require relevant software either in the microcontroller 110 or the bus(es) 114, 115 for controlling such devices through software at runtime.

Bus 115 is also used to allow microcontroller 110 to communicate with various sensors 156 for monitoring device 100's status. These may include, but are not limited to, sensors for water and air temperature, water level, humidity, load, sound, light etc. . . . according to device 100's application. It would be understood by those skilled in the art that other sensors would be included depending upon the particular implementation. Microcontroller 110 also communicates via bus 114 with user interface devices 150 for user control and monitoring of system 100 in embodiments of the present invention. Such user interface devices include display 155 coupled to a through a display controller 152 to the microcontroller, as well as sensing capability, such as capacitive or resistive touch panel 154 with accompanying touch controller 153 for single or multi-touch user functionality. As mentioned above, the display 155 and touch panel 154 may be collocated according to implementation. User interface devices 150 may include knobs, lights, buttons, switches, speakers, buzzers or other feedback devices, or other user input and output devices (not shown), according to implementation, such as for an IoT device.

Figure 2:
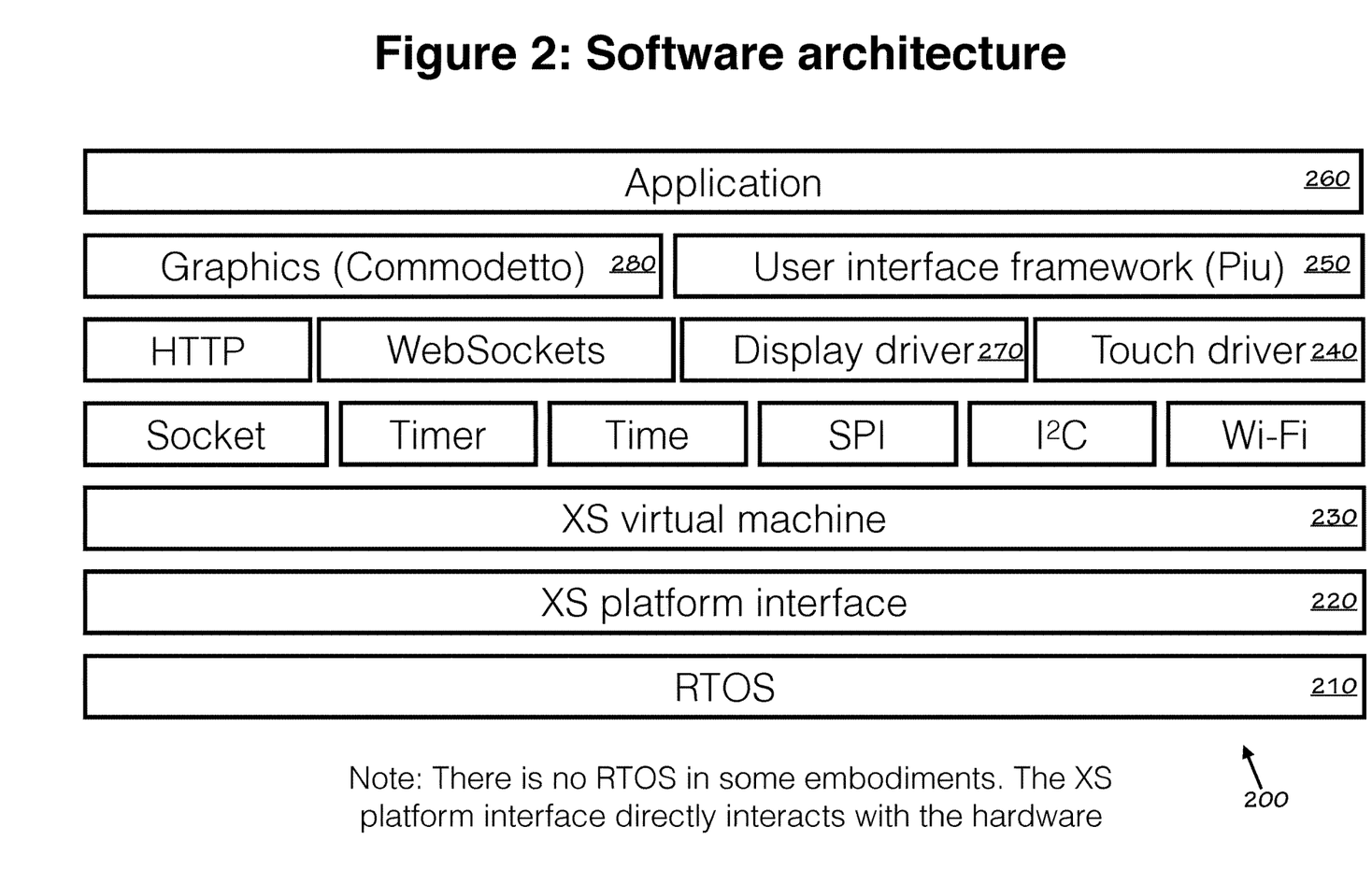
FIG. 2 shows a functional block diagram of the software components for a deployed system in embodiments of the present invention.

FIG. 2 is a diagram of the software architecture 200 in one embodiment of the present invention. The software show here is illustrated as a stack for convenience showing a hierarchy of functionality and may be implemented as such, but one skilled in the art can understand it also can be implemented as a collection of modules that communicate between certain one or more modules other in another implementation. For example, some modules (SPI, I$^2$C) can communicate with the RTOS directly, and also depend on the XS virtual machine.

In embodiments of the present invention, the device 100 runs both a Real-Time Operating System (RTOS) which is makes native calls to the functionality of the device, and an XS virtual machine which interprets and executes JavaScript at runtime. Depending on implementation the RTOS can be omitted where only the virtual machine will be present. Where both are present, the virtual machine communicates with the RTOS via a platform interface. Oftentimes, native functionality of the RTOS is used for time-critical tasks, such as rendering and/or display update. In another embodiment, a RTOS is not present, the XS virtual machine communicates with the host hardware directly (a so-called "bare metal" execution). Other implementations using dynamic objects at runtime are contemplated within the spirit and scope of the present invention.

In embodiments of the present invention, one or more application(s) 260 can communicate with the RTOS 210 or the virtual machine 230 via various frameworks. These may include, for the purposes of this disclosure, touch and or display functionality provided by a user interface framework 250 such as Piu. User interface 250 does this by invoking display driver 270 and/or touch driver 250, in some embodiments by invoking the graphics library 280, such as Commodetto.

This invention eliminates the problems associated with executing dynamic scripting languages, in particular, ECMAScript/JavaScript on modern low cost, low capability (e.g. limited RAM) hardware. Some embodiments of this invention use MCU processors typically having a single CPU operating at between 40 and 200 MHz, and having between 32 and 512 KB of RAM, configured such as device 100 shown in FIG. 1. Compare this to modern computers and mobile devices running multiple CPU cores at over 1 GHz each, and containing over a 1 GB of RAM where memory efficiency is not so critical (but may otherwise benefit from the efficient use of memory taught by embodiments of the present invention).

The present invention addresses the memory constraints by moving significant parts of the virtual machine's data structures to ROM (which may not strictly be read-only in some deployments, for example non-volitile re-writable Flash memory may be used). A typical MCU product has between 256 KB and 4 MB of ROM, typically many times more ROM than RAM. Devices are configured this way because ROM typically costs many times less than RAM. While other scripting implementations have moved some portions of their virtual machine to ROM, this invention is unprecedented in how much it is able to store in ROM. At the same time, this invention ensures scripts do not perceive any loss in functionality. For example, in a dynamic language, all objects are mutable. Storing objects in ROM would seem to require them to be immutable. This invention allows objects in ROM to be modified by scripts as if they were stored in RAM by using a dynamic alias mechanism which stores modified properties in RAM, while unchanged properties remain in ROM.

Figure 3A:
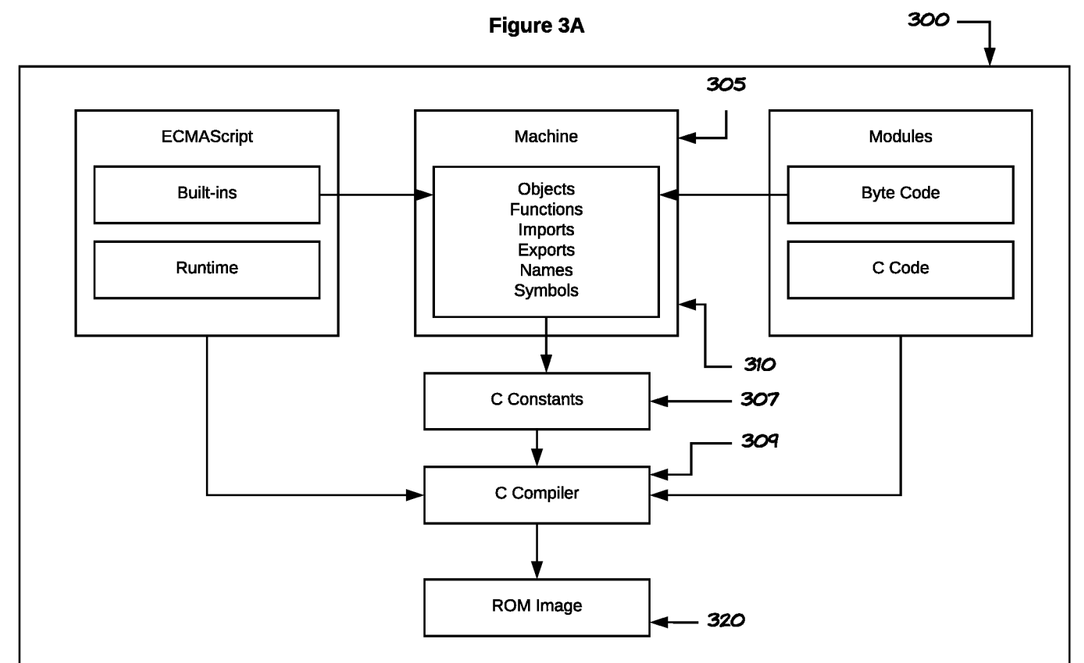
FIG. 3a shows a functional block diagram of the software components for a development system in embodiments of the present invention.

The invention begins by building (or instantiating) the virtual machine 305 on another device (e.g. computer 300 of FIG. 3*a*), one with more RAM. This executes the initialization phase of the virtual machine on a computer as part of the build process. This creates a virtual machine 305 with instantiated objects (e.g. 310). The virtual machine image 305 is then captured and optimized, for example eliminating unused memory slots and chunks, and moving slots accessed together to adjacent locations (e.g. 307 and 309) to create a resulting ROM image 320.

Figure 3B:
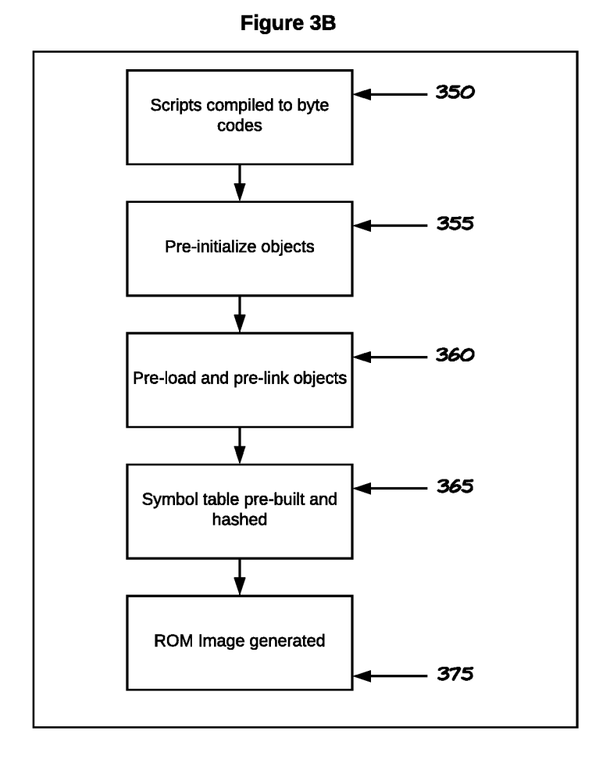
FIG. 3b shows functional steps of developing software for a deployed system in embodiments of the present invention.

In summary, embodiments of the present invention implement the following to deploy a virtual machine with efficient use of memory as shown in FIG. 3b. While a sequence is described in this embodiment, other implementations may use other sequences. Scripts are pre-compiled to byte codes—350, eliminating the need to deploy script source code to the device. Objects are pre-initialized—355. Modules are pre-loaded and pre-linked—360. The symbol table is pre-built and hashed—step 365. A resulting ROM image suitable for storage is then stored—375.

The following steps describe one embodiment of the above process of building a virtual machine on the build machine using the teachings of the present invention. It begins with JavaScript source code files and ends with a binary image ready to be deployed to the target device:

1. Compile one or more JavaScript source code files (e.g. module.js) using xsc compiler (JavaScript compiler) to generate XS byte code files (module.xsb). The output of the xsc compiler contains no data structures (e.g. objects, classes, etc). Executing the byte code in the file will create these.
2. Link the individually compiled modules together using xsl linker (JavaScript linker).
3. Instantiate a JavaScript virtual machine, which includes the JavaScript built-ins (classes, objects, globals, etc as defined in the language specification).
4. Execute all modules listed in the project manifest. (Note: because not all modules may be appropriate to pre-load, the project manifest enumerates those which should be.) This step executes the byte code of the body of each module to be pre-loaded, including recursively resolving any modules imported by the modules.

Once preloading is complete, the virtual machine is in the state to be deployed to the device. However, it exists only in memory of the build machine. It must be prepared for deployment to the target device. In the process of doing this, optional optimizations may be applied to the machine state to reduce the size of the virtual machine image and improve its runtime performance.

One such optimization is to run the garbage collector on the virtual machine heaps to remove any objects which were used during pre-loading but are no longer referenced and consequently to not need to be deployed to the device in the virtual machine image. Once the garbage collector completes, the heap is compacted to reduce its size. This reduces ROM capacity used in a typical deployment; it could reduce RAM as well, should the deployment choose to put the initial virtual machine image in RAM (e.g. on a device with sufficient RAM, where performance would be faster than ROM).

Another optimization is to identify JavaScript built-in functions and objects which are not used by the JavaScript code and linked together for this code. These unused objects and functions may be removed entirely or replaced with trivial stub functions which perform no operation other than generating an error. This reduces the ROM size, and in some embodiments the RAM requirements as well.

The virtual machine state contains many pointers. The address where the virtual machine image will loaded on the target device is likely different from where it was located in memory on the build machine. All pointers are converted to offsets, which are then used to generate C data structures that represent the virtual machine data structures (including the slots of the virtual machine). The following is an example code segment of this structure implemented in one embodiment of the present invention:

```
    ap[1503]}},
/*0001*/{NULL,    0,    0xc0,    XS_INSTANCE_KIND,
{.instance={NULL, NULL}}},
/*0002*/{NULL,    1,    0xc0,    XS_INSTANCE_KIND,
{.instance={NULL, NULL}}},
/*0003*/{NULL,    2,    0xc0,    XS_INSTANCE_KIND,
{.instance={NULL, NULL}}},
/*0004*/{NULL,    3,    0xc0,    XS_INSTANCE_KIND,
{.instance={NULL, NULL}}},
/*0005*/{NULL,    4,    0xc0,    XS_INSTANCE_KIND,
{.instance={NULL, NULL}}},
/*0006*/(txSlot*)&gxHeap[1423],    5,    0xc0,    XS_INSTANCE_KIND, {.instance NULL, NUL L}}},
/*0007*/{NULL,    6,    0xc0,    XS_INSTANCE_KIND,
{.instance={NULL, NULL}}},
/*0008*/{NULL,    7,    0xc0,    XS_INSTANCE_KIND,
{.instance={NULL, NULL}}},
/*0009*/{NULL, XS_NO_ID, 0x80, XS_STRING_X_KIND, {.string="@"}},
/*0010*/{NULL, XS_NO_ID, 0x80, XS_STRING_X_KIND, {.string="Symbol.asyncIterator"}},
/*0011*/{NULL, XS_NO_ID, 0x80, XS_STRING_X_KIND, {.string="Symbol.hasInstance"}},
. . .
/*0151*/(txSlot*)&gxHeap[137],    -32626,    0x84, XS_KEY_X_KIND, .key "cosh", 0x622 }}},
/*0152*/{NULL, -32625, 0x84, XS_KEY_X_KIND, .key "count", 0xccc}}},
. . .
/*0476*/(txSlot*)&gxHeap[477],    XS_NO_ID,    0x8f, XS_CALLBACK_X_KIND, .callback={f x_Enumerator, NULL}}},
. . .
/*0795*/{NULL, -32678, 0x8e, XS_HOST_FUNCTION_KIND, {.hostFunction={&gxBuilders[2 00], NULL}}},
/*0796*/(txSlot*)&gxHeap[797],    25,    0xc0,    XS_INSTANCE_KIND, {.instance={NULL, (tx Slot*)&gxHeap[422]}}},
. . .
```

Once the C source code representing the virtual machine image is generated, the native C compiler (e.g. GCC) is used to compile the entire firmware image (including the virtual machine image). The native linker (e.g. GCC, again) is used to link the firmware image, relocating the addresses of the structures in the virtual machine to their assigned address on in the device address space.

As a result of the foregoing, all mutable objects (for the virtual machine are assigned an index in an alias table. (See e.g. FIGS. 4a-4c which show setting the variables this.y and this.z using the alias tables 460, 470, and 480 at various points in time). Objects which have an alias table index may remain stored in ROM during execution with any modifications stored in RAM (as shown), making them mutable when the device image is executed on the target device. The virtual machine image 305 is packaged into a relocatable ROM image 320 in FIG. 3a, C language data structures in one embodiment as discussed above.

Figure 4A:
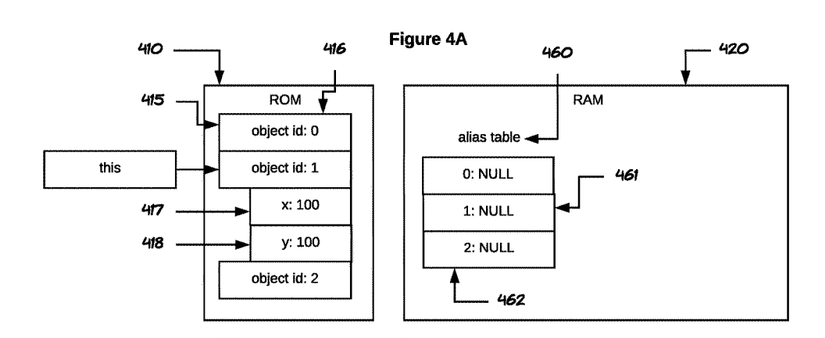
FIGS. 4a-4c shows an example of the structure of non-volatile memory (ROM) and volatile memory (RAM) over time at runtime in embodiments of the present invention.
Figure 4B:
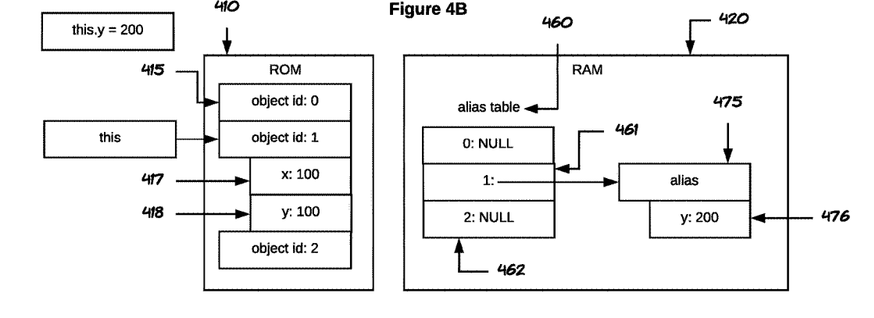
Figure 4C:
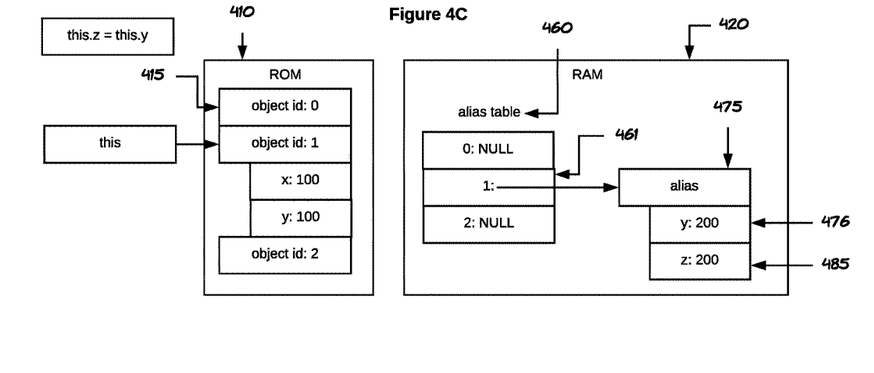

FIGS. 4a-4c show an example of the state of memory during runtime after the build process above has completed and the virtual machine starts executing.

Specifically, this example shows how the properties this.x, this.y, and this.z of the "this" object are modified at various points in time. ROM contains immutable data at runtime, RAM is used to contain data which is mutable (modifications to properties from other than their initial value). Code executable by the virtual machine in this example has a ROM 410 which contains an object table 415 containing an object 411 such as This having the properties This.x 417 and This.y 418. Objects in the table are also stored with a corresponding index (object ID) 416.

Upon execution of the virtual machine at runtime, an alias table 460 is allocated in RAM. Alias table 460 contains entries such as 461 which, via an object ID 462, correspond with entries in the ROM object table 415. The entries also contain a reference 463 to additional properties modified at runtime. As shown in FIG. 4*a*, because no modifications have occurred to the virtual machine's properties yet, the alias table 460 is still an the initial state wherein all of the references in alias table 460 are NULL.

At a subsequent time period, as shown in FIG. 4*b*, the property this.y is set equal to 200. ROM object table 415 stays unchanged (object data that is immutable). Because this.y is to be modified from other than its initial state, a change is made to RAM via the alias table 460 as shown in FIG. 4*b*. The reference 461 of the "this" object (object ID=1) is modified from NULL to contain a reference to a second location 475 created in RAM. 475 contains an alias for the "this" object which contains the new value, 200, of the y property. Subsequent runtime references to the this.y property in embodiments of the invention then reference the alias 475 rather than the initial value 418 contained in ROM due to the updated reference 461.

At yet another subsequent time period, as shown in FIG. 4*c*, a new property of the "this" object this.z is set equal to this.y. Because this.y has been previously modified as above, the reference 461 is used to retrieve the value this.y 476 from alias 475. Because this.z did not exist at the intial state shown in FIG. 4*a*, a new value 485 is created in the alias 475. Then, the new value for the new property this.z is set equal to this.y at the new location 485 in RAM. Subsequent references to the this.z property are then made to the value contained at location 485 in alias 475.

In summary, in order to conserve RAM, embodiments of the present invention store initial states and object information about all objects of the virtual machine for runtime in ROM, and only store subsequent state information in RAM referenced by an alias table. Pre-executing moves all initial object instance state into ROM (reducing RAM use from 100's or 10's of KB to under 4 KB, exclusive of execution stack), while speeding start-up time of virtual machine (e.g. 1.5 ms on 80 MHz device).

In addition to reduced memory requirements and faster launch there are additional benefits provided by embodiments of the present invention:

Because scripts pre-compiled to byte codes, this eliminates the need to deploy script source code to device;

By reducing the size of virtual machine memory heaps in RAM, the work performed by the garbage collector is reduced, consequently increasing runtime performance; and All performance benefits also save energy (e.g. faster initialization and faster garbage collection take less time and so processing consumes less energy).

Additionally, another advantage is that multiple virtual machines may be instantiated from the same ROM image. Benefits of this include:

Multi-core devices (e.g. ESP32) can run a separate virtual machine on each CPU core with minimal incremental memory use Separate virtual machine for secure operations, helps ensure isolation from user scripts.

Thus, a more efficient memory management scheme for a system implementing a virtual machine has been described. While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method for the efficient use of memory performed in a computer system while executing application code, the computer system having a non-volatile memory (ROM) containing initial states of objects for the application code and volatile memory (RAM) comprising the following steps:
   a) accessing a first entry in an alias table corresponding with a first application object for the application code in the RAM, the first entry having a first location in the RAM corresponding to an initial state of the first application object for the application code stored in a second location in the ROM;
   b) determining whether the first entry in the alias table references a third location in the RAM containing an updated property of the first application object;
   c) if the entry in the alias table references a third location in the RAM, then performing computation upon the updated property of the first application object contained in the third location;
      else if the first entry in the alias table doesn't reference the third location in the RAM, then performing computation upon the data contained in the second location, storing a modified property for the first application object resulting from the computation at a fourth location in the RAM, and updating the first entry in the alias table to reference the fourth location.

2. The method of claim 1 wherein an initialization phase of the application code comprises preloading application code and generating the initial states of objects for the application code.

3. The method of claim 2 wherein the initialization phase of the code further comprises removing objects which are not referenced.

4. The method of claim 3 wherein the initialization phase of the code further comprises executing a garbage collector.

5. The method of claim 4 wherein the initialization phase of the code further comprises compacting the heap.

6. The method of claim 5 wherein the initialization phase of the code further comprises removing built-in functions and objects which are not used.

7. The method of claim 6 wherein the initialization phase of the code further comprises converting references to offsets.

8. A non-transient computer readable medium comprising code for efficiently using memory in a computer while executing application code, the computer having a non-volatile memory (ROM) containing initial states of objects for the application code resulting from an initialization phase of the application code and volatile memory (RAM), and when executed, the code causing the computer to perform the following steps:
   a) accessing an entry in an alias table for an application object for the application code in the RAM, the entry in an alias table having a first location in the RAM corresponding to an initial state of the property of the application object stored in a second location in the ROM;

b) determining whether the entry in the alias table references a third location in the RAM containing an updated property of the application object;

c) if the entry in the alias table references a third location in the RAM, then performing computation upon the data contained in the third location;

d) else, performing computation upon the data contained in the second location, and storing a result of the computation at a fourth location in the RAM, and updating the entry in an alias table to reference the fourth location.

9. The medium of claim 8 further comprising code for repeating steps a-d iteratively on each referenced application object while executing the application code.

10. The medium of claim 9 wherein the initialization phase of the application code further comprises converting references to offsets.

11. The medium of claim 8 wherein the entry in the alias table contains no reference if the property of the application code object has not been modified at runtime.

12. The medium of claim 11 wherein the entry in the alias table is null if the property of the application code object has not been modified at runtime.

13. The medium of claim 8 further wherein the initialization phase of the application code comprises preloading application code and generating the initial states of objects for the application code.

14. The medium of claim 13 wherein the initialization phase of the application code further comprises removing objects which are not referenced.

15. The medium of claim 14 wherein the initialization phase of the application code further comprises executing a garbage collector.

16. The medium of claim 15 wherein the initialization phase of the application code further comprises compacting the heap.

17. The medium of claim 16 wherein the initialization phase of the application code further comprises removing built-in functions and objects which are not used.

* * * * *